United States Patent
S H et al.

(10) Patent No.: US 11,501,622 B2
(45) Date of Patent: Nov. 15, 2022

(54) SYSTEM AND METHOD FOR DETERMINING A LOCATION OF AN EXPLOSIVE DEVICE

(71) Applicant: HCL Technologies Limited, New Delhi (IN)

(72) Inventors: Hanumanthappa S H, Bangalore (IN); Jayaramakrishnan Sundararaj, Bangalore (IN)

(73) Assignee: HCL Technologies Limited, Delhi (IN)

( * ) Notice: Subject to any disclaimer, the term of this patent is extended or adjusted under 35 U.S.C. 154(b) by 157 days.

(21) Appl. No.: 17/147,997

(22) Filed: Jan. 13, 2021

(65) Prior Publication Data
US 2021/0225148 A1 Jul. 22, 2021

(51) Int. Cl.
| | |
|---|---|
| G08B 21/02 | (2006.01) |
| H04W 64/00 | (2009.01) |
| H04W 84/18 | (2009.01) |
| G16Y 40/35 | (2020.01) |
| G16Y 20/10 | (2020.01) |
| G16Y 40/50 | (2020.01) |
| G16Y 40/10 | (2020.01) |
| H04B 17/318 | (2015.01) |

(52) U.S. Cl.
CPC .............. *G08B 21/02* (2013.01); *G16Y 20/10* (2020.01); *G16Y 40/10* (2020.01); *G16Y 40/35* (2020.01); *G16Y 40/50* (2020.01); *H04B 17/318* (2015.01); *H04W 64/003* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 7,994,926 B2 | 8/2011 | Longman et al. | |
| 9,978,251 B2 | 5/2018 | Gonia et al. | |
| 2009/0243855 A1* | 10/2009 | Prokopuk | G01S 13/825 340/572.1 |
| 2014/0028457 A1* | 1/2014 | Reinpoldt | G06V 20/52 340/552 |
| 2015/0168545 A1* | 6/2015 | Cho | G01S 11/14 367/118 |

(Continued)

FOREIGN PATENT DOCUMENTS

WO 2017033479 A1 5/2017

*Primary Examiner* — Caroline H Jahnige
*Assistant Examiner* — Abderrahmen Chouat
(74) *Attorney, Agent, or Firm* — Kendal Sheets

(57) ABSTRACT

Disclosed is a system (102) for determining a location of an explosive device. The system (102) detects an explosive device using one or more devices (204) based on one or more nano-explosive detection sensors (206) associated with the one or more devices (204). The system (102) further identifies a type, a quantity and a signal strength associated with the explosive device. The system (102) computes a distance between the explosive device and the one or more devices (204). The system (102) determines explosive device co-ordinates based on the computed distance and device co-ordinates associated with each device (204). The system (102) receives a data packet comprising data associated with the explosive device from the one or more devices (204). The system (102) determines a location of the explosive device based on an analysis of the data packet received from the one or more devices (204).

16 Claims, 6 Drawing Sheets

(56) References Cited

U.S. PATENT DOCUMENTS

| | | | |
|---|---|---|---|
| 2017/0265031 A1* | 9/2017 | Nation | H04W 4/029 |
| 2017/0350834 A1* | 12/2017 | Prado | G01R 33/441 |
| 2018/0190096 A1 | 7/2018 | Lundy | |
| 2019/0101365 A1* | 4/2019 | Park | G01N 33/0057 |
| 2020/0135004 A1* | 4/2020 | Ellenbogen | G01R 33/1223 |
| 2020/0213146 A1* | 7/2020 | Kodam | G01N 33/0057 |

* cited by examiner

SYSTEM AND METHOD FOR DETERMINING A LOCATION OF AN EXPLOSIVE DEVICE

CROSS-REFERENCE TO RELATED APPLICATIONS AND PRIORITY

The present application does not claim priority from any patent application. This patent application does not claim priority from any application. The present application claims benefit from Indian Complete Patent Application No. 202011002917 filed on 22 Jan. 2020 the entirety of which is hereby incorporated by reference.

TECHNICAL FIELD

The present disclosure in general relates to the field of cellular communication. More particularly, the present invention relates to a system and a method for determining a location of an explosive device using cellular communication.

BACKGROUND

Generally, there are a number of conventional systems for ensuring security of highly sensitive areas such as airport, railway stations, theatres, sports stadium and the like. Typically, the conventional systems detect a presence of explosives in public places based on static object scanning mechanism, through manual intervention. The conventional systems further generate alarms based on detection of the explosive. However, the conventional systems may not be accurate in predicting an exact location of a moving explosive device and affecting coverage area associated with the explosive device.

SUMMARY

Before the present system and method for determining a location of an explosive device is described, it is to be understood that this application is not limited to the particular systems, and methodologies described, as there can be multiple possible embodiments which are not expressly illustrated in the present disclosure. It is also to be understood that the terminology used in the description is for the purpose of describing the particular versions or embodiments only, and is not intended to limit the scope of the present application. This summary is provided to introduce concepts related to the system and a method for determining a location of an explosive device. This summary is not intended to identify essential features of the claimed subject matter nor is it intended for use in determining or limiting the scope of the claimed subject matter.

In one implementation, a system for determining a location of an explosive device is illustrated. The system may comprise a memory and a processor coupled to the memory. The processor may be configured to execute instructions stored in the memory to detect an explosive device using one or more devices. The explosive device may be detected using one or more nano-explosive detection sensors associated with the one or more devices. Further, the processor may be configured to execute instructions stored in the memory to identify a type, a quantity and a signal strength associated with the explosive device upon detection of the explosive device. The type, the quantity and the signal strength may be identified using the one or more nano-explosive detection sensors. Further, the processor may be configured to execute instructions stored in the memory to compute a distance between the explosive device and the one or more devices. The distance may be computed based on an analysis of the type, the quantity and the signal strength. Further, the processor may be configured to execute instructions stored in the memory to determine explosive device co-ordinates based on the computed distance and device co-ordinates associated with each device. Further, the processor may be configured to execute instructions stored in the memory to receive a data packet comprising data associated with the explosive device from the one or more devices. The data associated with the explosive device may comprise the explosive device co-ordinates, the device co-ordinates, the distance, the signal strength, the type and the quantity of the explosive device. Further, the processor may be configured to execute instructions stored in the memory to determine a location of the explosive device based on an analysis of the data packet received from the one or more devices.

In another implementation, a method for determining a location of an explosive device is illustrated. The method may comprise detecting, by a processor, an explosive device using one or more devices. The explosive device may be detected using one or more nano-explosive detection sensors associated with the one or more devices. The method may further comprise identifying, by the processor, a type, a quantity and a signal strength associated with the explosive device upon detection of the explosive device. The type, the quantity and the signal strength may be identified using the one or more nano-explosive detection sensors. The method may further comprise computing, by the processor, a distance between the explosive device and the one or more devices. The distance may be computed based on an analysis of the type, the quantity and the signal strength. The method may further comprise determining, by the processor, explosive device co-ordinates based on the computed distance and device co-ordinates associated with each device. The method may further comprise receiving, by the processor, a data packet comprising data associated with the explosive device from the one or more devices. The data associated with the explosive device may comprise the explosive device co-ordinates, the device co-ordinates, the distance, the signal strength, the type and the quantity of the explosive device. The method may comprise determining, by the processor, a location of the explosive device based on an analysis of the data packet received from the one or more devices.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Figure 1:
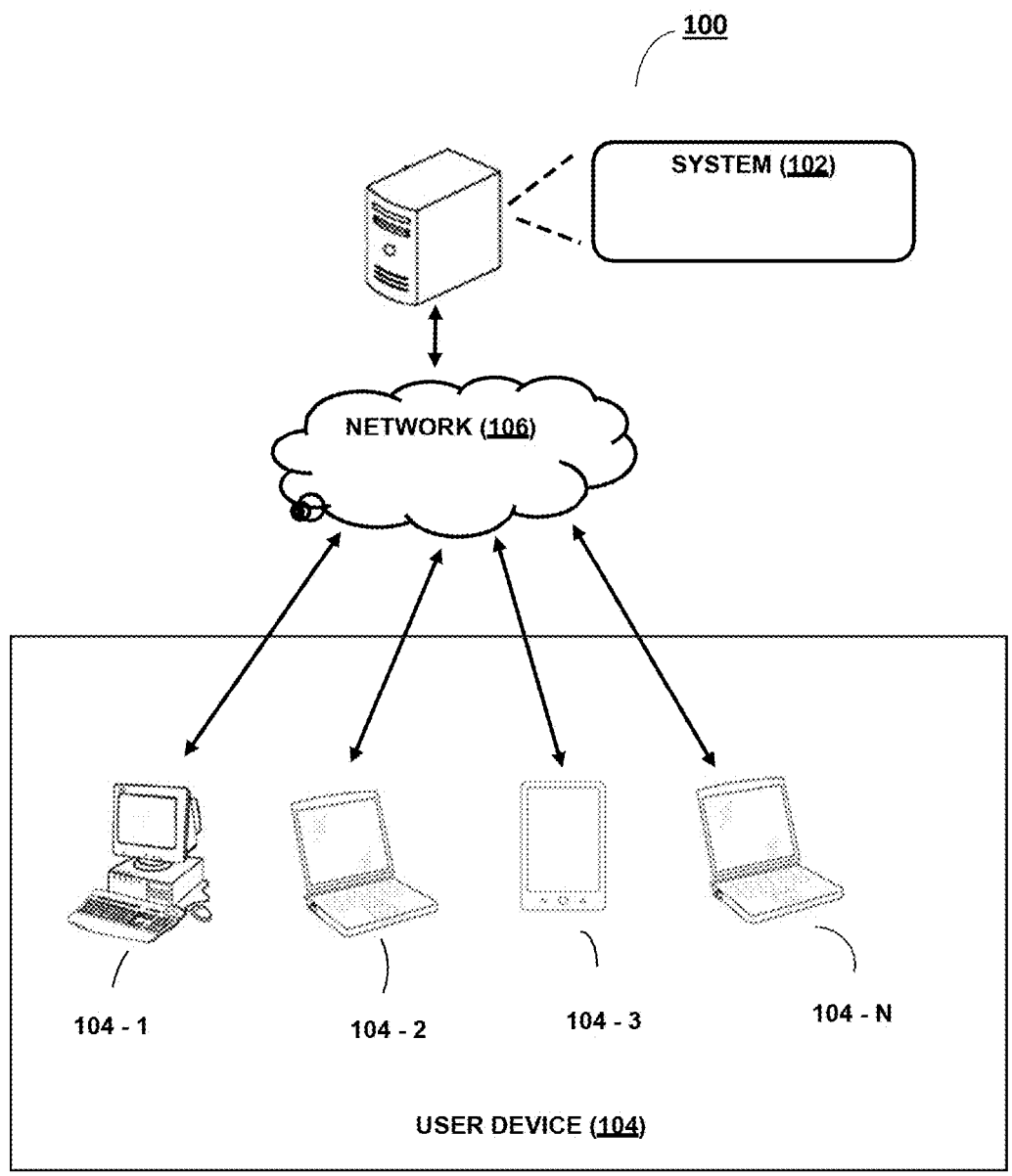
FIG. 1 illustrates a network implementation of a system 102 for determining a location of an explosive device, in accordance with an embodiment of the present subject matter.

Some embodiments of the present disclosure, illustrating all its features, will now be discussed in detail. The words "comprising", "receiving", "determining", "generating" and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a", "an" and "the" include plural references unless the context clearly dictates otherwise. Although any systems and methods similar or equivalent to those described herein can be used in the practice or testing of embodiments of the present disclosure, the exemplary, system and method for determining a location of an explosive device are now described. The disclosed embodiments of the system and method for determining a location of an explosive device are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure for system and method for determining a location of an explosive device is not intended to be limited to the embodiments illustrated, but is to be accorded the widest scope consistent with the principles and features described herein.

A conventional system of explosive detection may be based on static object scanning mechanism, through manual intervention. However, the conventional systems may not be accurate in predicting an exact location of a moving explosive device. Further, the conventional systems may fail to stop a moving explosive device from entering a highly sensitive area. In addition, the conventional system may fail to predict an affecting area density due to the explosive device. Further, the conventional system may raise an alarm, upon detection of the explosive device, thereby creating panic among the people.

The present subject matter overcomes the problems of the conventional system. The present subject matter relates to a system for determining a location of an explosive device. The system may be configured to detect an explosive device using one or more devices. The explosive device may be detected using one or more nano-explosive detection sensors associated with the one or more devices. The system may further identify a type, a quantity and a signal strength associated with the explosive device upon detection of the explosive device. The type, the quantity and the signal strength may be identified using the one or more nano-explosive detection sensors. The system may further compute a distance between the explosive device and the one or more devices. The distance may be computed based on an analysis of the type, the quantity and the signal strength. The system may further determine explosive device co-ordinates based on the computed distance and device co-ordinates associated with each device. The system may receive a data packet comprising data associated with the explosive device from the one or more devices. The data associated with the explosive device may comprise the explosive device co-ordinates, the device co-ordinates, the distance, the signal strength, the type and the quantity associated with the explosive device. The system may further determine a location of the explosive device based on an analysis of the data packet received from the one or more devices.

The system does away with the process of explosive detection using static object scanning mechanism through manual intervention. The system may lead to an accurate detection of the explosive device using cellular communication for improving safety of users. The system may provide multiple ways of explosive detection and alert mechanism using a Packet Data Convergence Protocol (PCDP), an Internet Protocol (IP) and a Transmission Control Protocol (TCP)/User Datagram Protocol (UDP) packets. Further, the system may detect a static or a moving explosive coordinate based on real-time tracking of the explosive device. The system may utilize a centralized core network for receiving data associated with the explosive device from multiple devices and easily communicating over neighbour eNodeB's for alerting. The system may receive data associated with the detected explosive device from multiple sources leading to more accurate detection of the exact location of the explosive device. The exact location may be used to determine a static or a moving explosive device. Further, the moving explosive device may be stopped from entering highly sensitive areas such as airports and the like.

Furthermore, the system may detect an affecting cell area associated with the explosive device based on the detected type, and the quantity of the explosive. Based on the detected affecting cell area, the system may generate alert messages for one or more users associated with the affecting cell area. The system may utilize a custom broadcast mechanism for alert generation. The system may transmit a high alert message to public safety centers and the one or more users associated with the affected cell area. Further, the system may transmit a low alert message to one or more users near the affecting cell area in order to stop movement of the users towards the affecting cell area. The system may thereby avoid panic among the users due to the detected explosive device. It is to be noted that the system may lead to an overall improvement in the process of explosive device detection using cellular communication.

Referring now to FIG. 1, a network implementation 100 of a system 102 for determining a location of an explosive device is disclosed. Although the present subject matter is explained considering that the system 102 is implemented on a server, it may be understood that the system 102 may also be implemented in a variety of computing systems, such as a laptop computer, a desktop computer, a notebook, a workstation, a mainframe computer, a server, a network server, and the like. In one implementation, the system 102 may be implemented over a cloud network. Further, it will be understood that the system 102 may be accessed by multiple users through one or more user devices 104-1, 104-2 ... 104-N, collectively referred to as user device 104 hereinafter, or applications residing on the user device 104.

Examples of the user device 104 may include, but are not limited to, a portable computer, a personal digital assistant, a handheld device, and a workstation. The user device 104 may be communicatively coupled to the system 102 through a network 106.

In one implementation, the network 106 may be a wireless network, a wired network or a combination thereof. The network 106 may be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network 106 may include a variety of network devices, including routers, bridges, servers, computing devices, storage devices, and the like.

Figure 2A:
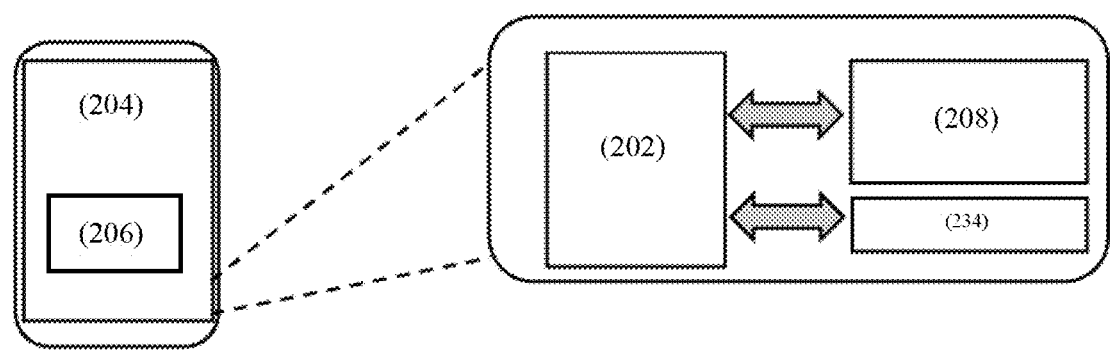
FIG. 2A illustrates a schematic diagram of a sensor data processing unit 202 integrated in the system 102 for determining a location of an explosive device, in accordance with an embodiment of the present subject matter.

Referring now to FIG. 2A, a schematic diagram of a sensor data processing unit 202 integrated in the system 102 for determining a location of an explosive device, is illustrated in accordance with an embodiment of the present subject matter.

Figure 2B:
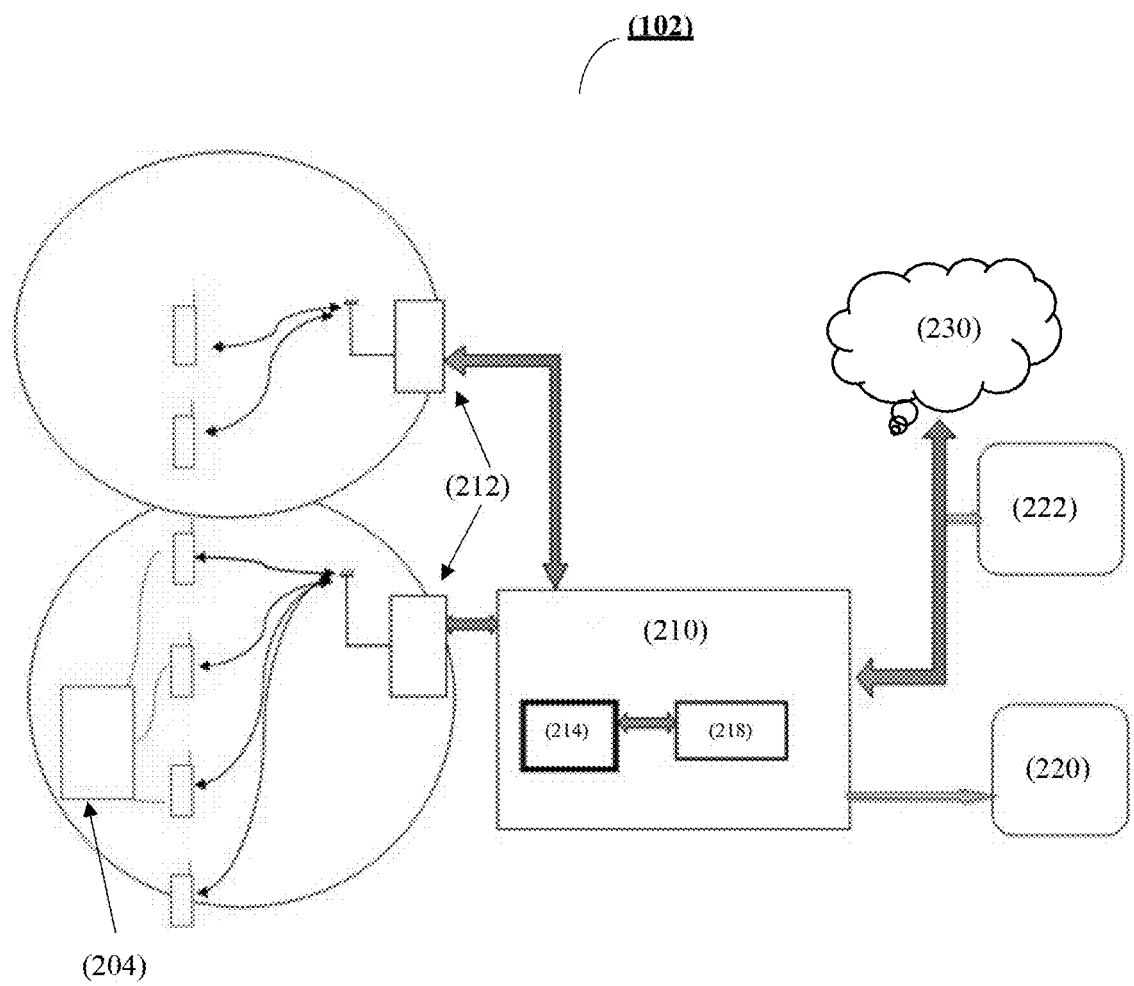
FIG. 2B illustrates a schematic diagram of a system 102 for determining a location of a fixed explosive device, in accordance with an embodiment of the present subject matter.

Referring now to FIG. 2B a schematic diagram of a system 102 for determining a location of a fixed explosive device, is illustrated in accordance with an embodiment of the present subject matter.

Figure 2C:
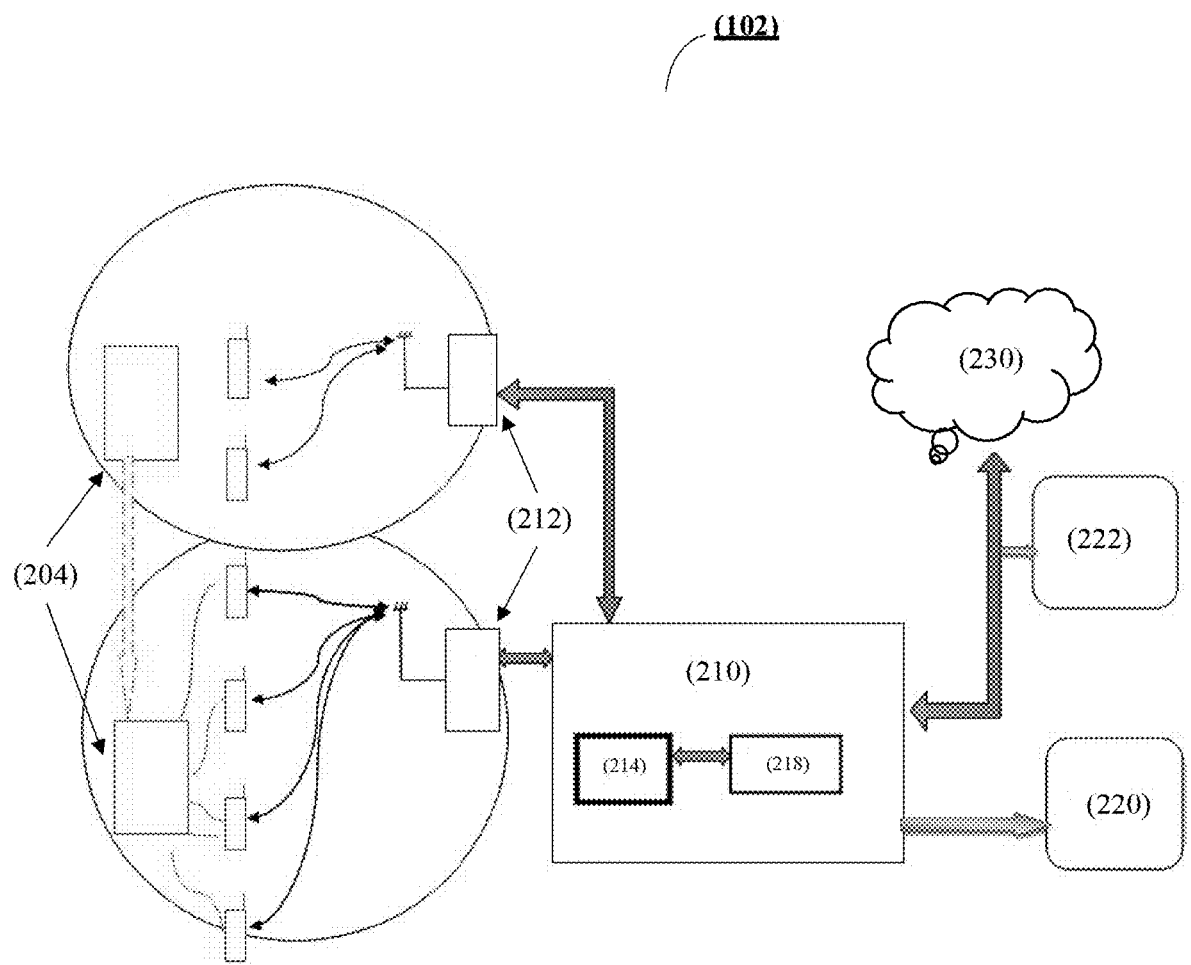
FIG. 2C illustrates a schematic diagram of a system 102 for determining a location of a moving explosive device, in accordance with an embodiment of the present subject matter.

Referring now to FIG. 2C a schematic diagram of a system 102 for determining a location of a moving explosive device, is illustrated in accordance with an embodiment of the present subject matter.

Figure 2D:
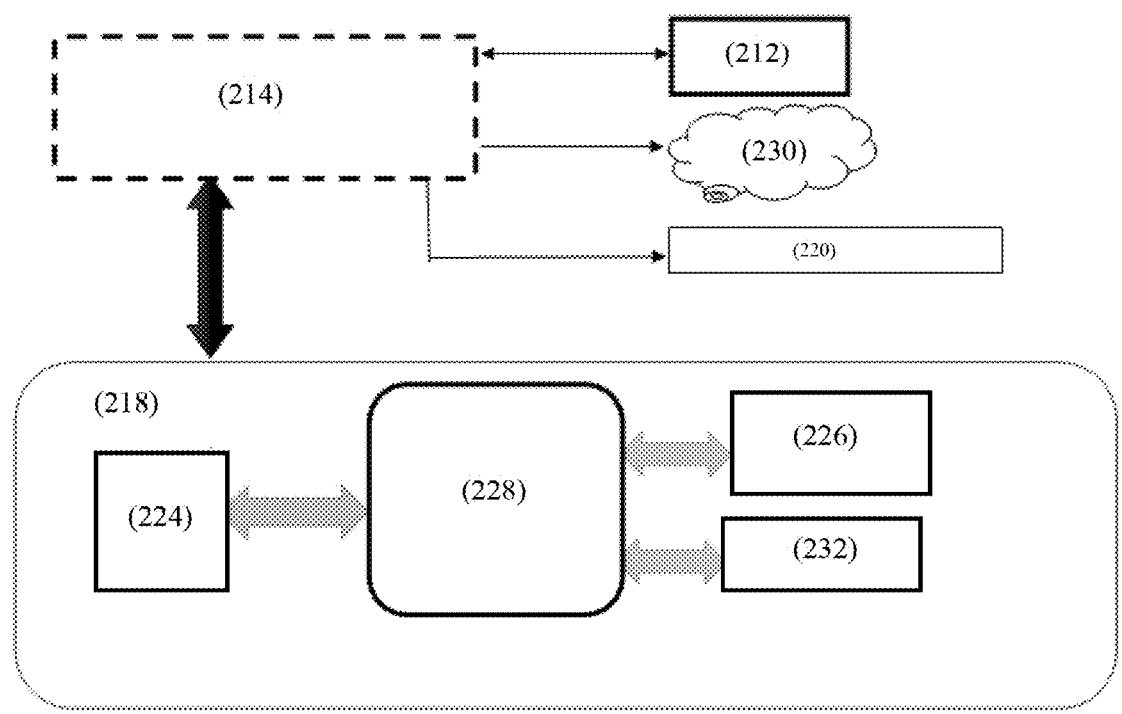
FIG. 2D illustrates a schematic diagram of an Explosive Identification and Processing System (EIPS) 218 integrated in the system 102 for determining a location of an explosive device, in accordance with an embodiment of the present subject matter.

Referring now to FIG. 2D a schematic diagram of an EIPS 218 integrated in the system 102 for determining a location of an explosive device, is illustrated in accordance with an embodiment of the present subject matter.

Further, the FIGS. 2A, 2B, 2C, and 2D are explained together.

In one embodiment, the system 102 may include at least one processor 228, an input/output (I/O) interface (not shown), and a memory 232. The at least one processor 228 may be implemented as one or more microprocessors, microcomputers, microcontrollers, digital signal processors, central processing units, state machines, logic circuitries, and/or any devices that manipulate signals based on operational instructions. Among other capabilities, at least one processor 228 may be configured to fetch and execute computer-readable instructions stored in the memory 232.

The I/O interface may include a variety of software and hardware interfaces, for example, a web interface, a graphical user interface, and the like. The I/O interface may allow the system 102 to interact with the user directly or through the user device 104. Further, the I/O interface may enable the system 102 to communicate with other computing devices, such as web servers and external data servers (not shown). The I/O interface may facilitate multiple communications within a wide variety of networks and protocol types, including wired networks, for example, LAN, cable, etc., and wireless networks, such as WLAN, cellular, or satellite. The I/O interface may include one or more ports for connecting a number of devices to one another or to another server.

The memory 232 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 232 may include data. The data, amongst other things, serve as a repository for storing data processed, received, and generated by the system 102.

In one implementation, a user may access the system 102 via the I/O interface. The user may be registered using the I/O interface in order to use the system 102. In one aspect, the user may access the I/O interface of the system 102 for obtaining information, providing input information or configuring the system 102.

In one embodiment, the system 102 may comprise one or more devices 204 to detect a nearby explosive device. The one or more devices 204 may comprise one of a mobile device, an Internet of Things (IoT) device. Further, the one or more devices 204 may comprise one or more nano-explosive detection sensors 206 associated with the one or more devices 204 for detecting the explosive device. The one or more nano-explosive detection sensors 206 may be configured to detect a type, a signal strength and a quantity of the explosive device. Further, the system 102 may comprise a sensor data processing unit 202 for processing data received from the one or more nano-explosive detection sensors 206 and a sensor data memory 234 for storing data processed by the sensor data processing unit 202.

In one embodiment, the system 102 may further comprise an explosive co-ordinate prediction unit 208. The explosive co-ordinate prediction unit 208 may utilize a first Knowledge based Explosive detection and Predictive (KEDP) algorithm for determining co-ordinates of the explosive device. The first KEDP algorithm may comprise a pre-analysed data set related to type, quantity and signal strength of explosive devices. Further, the first KEDP algorithm may compute a distance between the explosive device and the one or more devices 204. The distance may be computed based on comparison of the detected type, the quantity and the signal strength of the explosive device with the pre-analysed data set.

The distance may be computed using equation (1)

$$\text{Distance of explosive} = \text{Process}\{\text{type, quantity, signal strength}\} \quad (1)$$

In one embodiment, the first KEDP algorithm may further determine explosive device co-ordinates based on the computed distance and device co-ordinates associated with each device from the one or more devices 204. The device co-ordinates may be determined using one or more of a Global Positioning System (GPS), a Global Navigation Satellite System (GNSS) technique. The explosive device co-ordinates may be determined by adding the computed distance and the device co-ordinates. The explosive device co-ordinates may be determined using equation (2).

$$\text{Explosive co-ordinate} = \text{Mobile co-ordinate} + \text{Distance of explosive} \quad (2)$$

In one exemplary embodiment, considering a type of an explosive device detected is RDX, the quantity is 1000 g and the signal strength is 30%. The distance is 2 in. The mobile coordinate is 0.0.0.2. Based on the identified data associated with the explosive device, the explosive coordinate is determined using the above equation (2). Explosive coordinate=0.0.0.2+2m In one embodiment, the first KEDP algorithm may build a data packet comprising data associated with the explosive device received from the one or more devices 204 along with an explosive information field. The explosive identification field may be set in a Transmission Control Protocol (TCP), an Internet Protocol (IP), or a Packet Data Convergence Protocol (PDCP) packet. This may help a Packet Data Network Gateway (PDN-GW) 214 to process the explosive sensor devices data easily. The data associated with the explosive device may comprise the explosive device co-ordinates, the device co-ordinates, the distance, the signal strength, the type and the quantity of the explosive device. The sensor data processing unit 202 may build the data packet only when a predefined threshold meets with explosive identification field in the TCP, the IP or the PDCP packet.

In one embodiment, the first KEDP algorithm may transmit the data packet to a core network 210 for further processing. The data packet may be transmitted with an interval of 30 seconds. The data packet may be stopped from transmitting once the explosive device is defused using the system 102.

In one embodiment, the first KEDP algorithm may transmit one or more types of data packets with specific enable field to identify data associated with the explosive device at the core network 210.

In first type of data packet, the first KEDP algorithm may use the Long Term Evolution (LTE) Packet Data Convergence Protocol (PDCP) reserved field to convey explosive information. Further, the first KEDP algorithm may build a Media Access Control (MAC) Protocol Data Unit (PDU) and transmit to the LTE Evolved Node B (eNodeB) 212. Further, the eNodeB 212 may scan the PDU to identify an explosive filed set in the PDCP. The eNodeB 212 may further convert the data to a GPRS Tunnelling Protocol (GTP) data unit with an explosive analysis flag set and transmit it to the core network 210. Further, a Packet Data Network (PDN) gateway 214 at the core network 210 may receive the data packet for processing. The PDN gateway 214 may further detect the data packet specific to an Explosive Identification and Processing System (EIPS) 218 and transmit the data packet to the EIPS 218.

In second type of data packet, the explosive device specific information created at the one or more devices 204 may use reserved field in the Transmission Control Protocol (TCP)/User Datagram Protocol (UDP) header for identification of the data associated with the explosive device.

In third type of data packet, the explosive identification field may be added in the 'differentiated services field' in the IP packet.

In one embodiment, the sensor data processing unit 202 may build the data packet over PDCP header field with reserved field as explosive bit field. Further, eNodeB 212 may be configured to receive the data packet. The eNodeB 212 may determine the explosive packet from the one or more data packets. Further, the eNodeB 212 may convert the explosive packet to a GTP data packet, mentioned as high priority GTP packet to be processed at the PDN-Gateway 214. The high priority GTP packet may be transmitted to the core network (EPC) PDN-Gateway 214. Further, the data packet may be forwarded as the GTP packet to the core network 210, in case the PDCP do not contain the explosive bit field.

In one embodiment, the core network 210 referred as an Evolved Packet Core (EPC) may be a centre of all data processing, detection, prediction and alert generation for the system 102. The core network 210 may comprise the PDN-GW 214, a Software Defined Networking Gateway (SDNGW) 216 and the EIPS 218.

In one embodiment, the core network 206 may utilize a second KEDP algorithm for further processing. The second KEDP algorithm may be active only in case if the received data packet contains emergency field enabled. Further, by using deep packet inspection of incoming data packets, the PDN-GW 214 may detect the explosive field in any one of the data packet type i.e. GTP TCP/UDP, IP packets and may forward the packet to the EIPS 218 for further processing.

In one embodiment, the EIPS 218 may receive the information from the data packet related to the explosive device co-ordinates, the device co-ordinates, the distance, the signal strength, the type and the quantity associated with the explosive device. The EIPS 218 may accumulate the all the received data packets from the one or more devices 204. Further, the EIPS 218 may trigger the second KEDP algorithm for further processing by using a processor 228, on receiving a minimum of ten data packets from the one or more data packets. The processor 228 may be referred as a second KEDP algorithm processing and decision unit 228.

In one embodiment, the second KEDP algorithm may further process the data received from the one or more data packets. The second KEDP algorithm may process and accurately estimate the exact type, and the quantity of the explosive by using the collective data received from the one or more devices 204. The exact type and the quantity of explosive may be determined using below equation (3).

$$\text{Exact type and quantity of the explosive} = \text{Process}\{M1\{\text{type1, qunatity1, distance1}\}, M2\{\text{type2, qunatity2, distance2}\} \ldots Mn\{\text{typeN, quantityN, distanceN}\}\} \quad (3)$$

where M=the one or more device 204 and
N=0 to number of packet processing.

Further, the second KEDP algorithm may determine the distance of the explosive device based on the device co-ordinates and the explosive co-ordinates basedon collective data received from the one or more data packets. The distance of the explosive device may be determined by using equation (4)

$$\text{Distance}N = \text{mobile coordinate}N - \text{explosive coordinate}N \quad (4)$$

where mobile co-ordinates indicates the device co-ordinates.

Furthermore, the second KEDP algorithm may determine a percentage of affecting cell area associated with the explosive device based on comparison of the data associated with the explosive device and historical data related to the detected type and the quantity of the explosive device. The percentage of affecting cell area may be determined by using equation (5)

$$\text{Affecting area due to explosive} = \text{Process}\{\text{type, quantity}\} \quad (5)$$

Furthermore, the second KEDP algorithm may processes and accurately determine the exact location of the explosive device based on a collective analysis of the one or more data packets received from the one or more devices 204. The exact location of the explosive device may be determined by using equation (6).

$$\text{Exact location of Explosive} = \text{Process}\{\text{Exp\_coordinate1, Exp\_coordinate2} \ldots \text{Exp\_coordinate}N\} \quad (6)$$

where N=0 to Number of packet processing

In next step, the second KEDP algorithm may identify a number of base stations and one or more users associated with the base stations based on the affecting cell area to broadcast an alert message.

In next step, the second KEDP algorithm may determine a mobility of the explosive device based on real time and last detected explosive device co-ordinates. Further, based on the exact location, the explosive device may be declared as static or moving. The EIPS 218 may be configured to detect more than one explosive device based on the analysis of the one or more device coordinates, and the data associated with the explosive device received from the one or more devices 204.

In one embodiment, the EIPS 218 may further process the information received from the second KEDP algorithm. The EIPS 218 may comprise a data routing unit 224, a data analyser unit 226 and a memory 232. The data routing unit 224 may be connected with the PDN-GW 214 and the second KEDP algorithm. The data routing unit 224 may verify the data packet for explosive information. The data routing unit 224 may route the data packet for further processing if the data packet contains explosive information. Further, the data routing unit 224 may ignore the data packet if the data packet does not contains explosive information. Further, the data analyser unit 226 may comprise one or more machine learning algorithms to apply on a stored historical data and pre-analysed data for accurate calculation of the location, the type, the quantity and its effecting area associated with the explosive device. In next step, the EIPS 218 may analyse the data associated with the explosive device received from all the one or more devices 204 for 1 minute. Based on an analysis of the data, the EIPS 218 may broadcast a high alert message in specific format such as SIB12 Commercial Mobile Alert System (CMAS) to the one or more users associated with the base stations in the affecting cell area. The EIPS 218 may transmit the high alert message in every 30 seconds to the one or more users associated with the base stations in the affecting cell area. The high alert message may comprise the exact location of the detected explosive device.

Further, the EIPS 218 may transmit the high alert message to all adjacent public safety centers 220, private entities 222 and a cloud network 230 in every 1 minute. The EIPS 218 may update the explosive device coordinates in real time. The RIPS 218 may broadcast the high alert message only 5 times to the one or more users if the location of the explosive device is static, in order to avoid panic among the one or more users.

In one embodiment, the EIPS 218 may further transmit a low alert massage to one or more users near or travelling towards the affecting cell area. Further, the EIPS 218 may stop transmission of the high alert message, if within 5 minutes no signal is received from the one or more devices 204 after screening the data explosive device. In next step, the EIPS 218 may resume after specific time interval with more accurate details of the detected explosive device.

Figure 3:
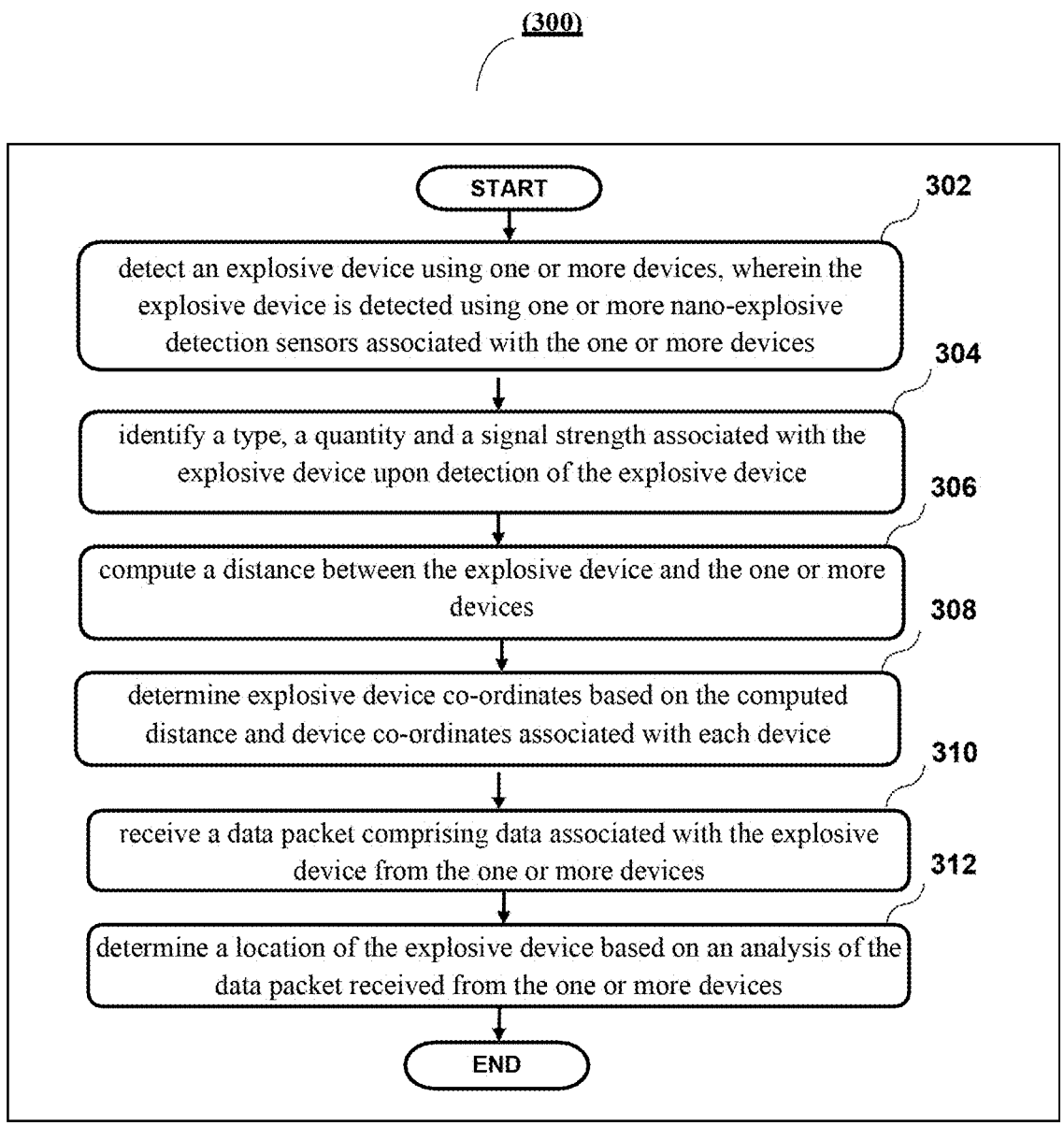
FIG. 3 illustrates a method 300 for determining a location of an explosive device, in accordance with an embodiment of the present subject matter.

Referring now to FIG. 3, a method 300 for determining a location of an explosive device, is disclosed in accordance with an embodiment of the present subject matter. The method 300 may be described in the general context of computer executable instructions. Generally, computer executable instructions can include routines, programs, objects, components, data structures, procedures, modules, functions, and the like, that perform particular functions or implement particular abstract data types. The method 300 may also be practiced in a distributed computing environment where functions are performed by remote processing devices that are linked through a communications network. In a distributed computing environment, computer executable instructions may be located in both local and remote computer storage media, including memory storage devices.

The order in which the method 300 is described is not intended to be construed as a limitation, and any number of the described method blocks can be combined in any order to implement the method 300 or alternate methods. Additionally, individual blocks may be deleted from the method 300 without departing from the spirit and scope of the subject matter described herein. Furthermore, the method 300 can be implemented in any suitable hardware, software, firmware, or combination thereof. However, for ease of explanation, in the embodiments described below, the method 300 may be considered to be implemented in the above described system 102.

At block 302, an explosive device may be detected using one or more devices 204. The explosive device may be detected using one or more nano-explosive detection sensors 204 associated with the one or more devices 204. The one or more devices 204 may comprise one of a mobile device, an Internet of Things (IoT) device.

At block 304, a type, a quantity and a signal strength associated with the explosive device may be identified upon detection of the explosive device. The type, the quantity and the signal strength may be identified using the one or more nano-explosive detection sensors 206. The one or more nano-explosive detection sensors may be configured to detect the type, the signal strength and the quantity of the explosive device based on predefined data.

At block 306, a distance between the explosive device and the one or more devices 204 may be computed based on an analysis of the type, the quantity and the signal strength. The distance may be computed based on comparison of the detected type, the quantity and the signal strength of the explosive device with the pre-analysed data set.

At block 308, explosive device co-ordinates may be determined based on the computed distance and device co-ordinates associated with each device 204. The explosive device co-ordinates may be determined by adding the computed distance and a device co-ordinates. The device co-ordinates may be determined using one or more of a Global Positioning System (GPS), a Global Navigation Satellite System (GNSS) technique.

At block 310, a data packet comprising data associated with the explosive device from the one or more devices 204 may be received. The data associated with the explosive device may comprise the explosive device co-ordinates, the device co-ordinates, the distance, the signal strength, the type and the quantity of the explosive device.

At block 312, a location of the explosive device may be determined based on an analysis of the data packet received from the one or more devices 204. Further, based on the location of the explosive device, an affecting cell area associated with the explosive device may be determined. The affecting cell area may be determined based on comparison of the data associated with the explosive device and historical data. Furthermore, based on the affecting cell area, a number of base stations and one or more users associated with the base stations may be identified. Furthermore, a high alert message may be transmitted to the one or more users associated with the base stations and one or more public safety centers 220. The high alert message may indicate the data associated with the explosive device. Further, a low alert massage may be transmitted to one or more users near the affecting cell area.

Exemplary embodiments discussed above may provide certain advantages. Though not required to practice aspects of the disclosure, these advantages may include those provided by the following features:

Some embodiments of the system and the method may enable multiple ways of explosive detection and alert mechanism using PCDP, IP and TCP/UDP packets.

Some embodiments of the system and the method may enable detection of a static or a moving explosive coordinate based on real-time tracking, and stopping the moving explosive device from entering a highly sensitive area.

Some embodiments of the system and the method may be configured to detect a type, and a quantity of the explosive device using one or more nano-explosive detection sensors.

Some embodiments of the system and the method may be configured to detect an affecting cell area associated with the explosive based on the detected type of explosive, and the quantity of the explosive.

Some embodiments of the system and the method may enable a custom broadcast mechanism for alert generation.

Some embodiments of the system and the method may be configured to transmit a high alert message for public safety centers and one or more users associated with the affecting cell area.

Some embodiments of the system and the method may be configured to transmit a low alert message for one or more users near the affecting cell area in order to stop movement of the users towards the affecting cell area.

Some embodiments of the system and the method may enable fast prediction and intimation of the explosive device to different stakeholders without creating havoc to unaffected areas.

Some embodiments of the system and the method may eliminate a requirement of manual security check at many points by using IOT device enabled with explosive detection sensors, thereby avoiding panics among the civils.

Some embodiments of the system and the method may be configured to receive input from multiple sources for more accurate detection of type, and quantity of the explosive device.

Some embodiments of the system and the method may be configured to improve safety of users in the affecting cell area by accurate detection and alerting related to the explosive device.

Although implementations for system and method for determining a location of an explosive device, it is to be understood that the appended claims are not necessarily limited to the specific features or methods described. Rather, the specific features and methods are disclosed as examples of implementations for determining a location of an explosive device.

The invention claimed is:

1. A system (102) for determining a location of an explosive device, the system (102) comprising:
    a memory (232);
    a processor (228) coupled to the memory (232), wherein the processor (228) is configured to execute instructions stored in the memory (232) to:
        detect an explosive device using one or more devices (204), wherein the explosive device is detected using one or more nano-explosive detection sensors (206) associated with the one or more devices (204);
        identify a type, a quantity and a signal strength associated with the explosive device upon detection of the explosive device, wherein the type, the quantity and the signal strength is identified using the one or more nano-explosive detection sensors (206);
        compute a distance between the explosive device and the one or more devices (204), wherein the distance is computed based on an analysis of the type, the quantity and the signal strength;
        determine explosive device co-ordinates based on the computed distance and device co-ordinates associated with each device (204);
        receive a data packet comprising data associated with the explosive device from the one or more devices (204), wherein the data associated with the explosive device comprises the explosive device co-ordinates, the device co-ordinates, the distance, the signal strength, the type and the quantity associated with the explosive device; and
        determine a location of the explosive device based on an analysis of the data packet received from the one or more devices (204).

2. The system (102) as claimed in claim 1, wherein the one or more devices (204) comprise one of a mobile device, an Internet of Things (IoT) device.

3. The system (102) as claimed in claim 1, wherein the device co-ordinates are determined using one or more of a Global Positioning System (GPS), a Global Navigation Satellite System (GNSS) technique.

4. The system (102) as claimed in claim 1, wherein the one or more nano-explosive detection sensors (206) are configured to detect the type, the signal strength and the quantity of the explosive device based on predefined data.

5. The system (102) as claimed in claim 1, further configured to determine an affecting cell area associated with the explosive device based on comparison of the data associated with the explosive device and historical data.

6. The system (102) as claimed in claim 1, further configured to identify a number of base stations and one or more users associated with the base stations based on the affecting cell area.

7. The system (102) as claimed in claim 1, further configured to transmit a high alert message to the one or more users associated with the base stations and one or more public safety centers (220), wherein the high alert message indicates the data associated with the explosive device.

8. The system (102) as claimed in claim 1, further configured to transmit a low alert massage to one or more users near the affecting cell area.

9. A method (300) for determining a location of an explosive device, the method (300) comprising:
    detecting, by a processor (228), an explosive device using one or more devices (204), wherein the explosive device is detected using one or more nano-explosive detection sensors (206) associated with the one or more devices (204);
    identifying, by the processor (228), a type, a quantity and a signal strength associated with the explosive device upon detection of the explosive device, wherein the type, the quantity and the signal strength is identified using the one or more nano-explosive detection sensors (206);
    computing, by the processor (228), a distance between the explosive device and the one or more devices (204), wherein the distance is computed based on an analysis of the type, the quantity and the signal strength;
    determining, by the processor (228), explosive device co-ordinates based on the computed distance and device co-ordinates associated with each device (204);
    receiving, by the processor (228), a data packet comprising data associated with the explosive device from the one or more devices (204), wherein the data associated with the explosive device comprises the explosive device co-ordinates, the device co-ordinates, the distance, the signal strength, the type and the quantity of the explosive device; and
    determining, by the processor (228), a location of the explosive device based on an analysis of the data packet received from the one or more devices (204).

10. The method (300) as claimed in claim 9, wherein the one or more devices (204) comprise one of a mobile device, an Internet of Things (IoT) device.

11. The method (300) as claimed in claim 9, wherein the device co-ordinates are determined using one or more of a Global Positioning System (GPS), a Global Navigation Satellite System (GNSS) technique.

12. The method (300) as claimed in claim 9, wherein the one or more nano-explosive detection sensors (206) are configured to detect the type, the signal strength and the quantity of the explosive device based on predefined data.

13. The method (300) as claimed in claim 9, wherein an affecting cell area associated with the explosive device is determined based on comparison of the data associated with the explosive device and historical data.

14. The method (300) as claimed in claim 9, wherein a number of base stations and one or more users associated with the base stations is identified based on the affecting cell area.

15. The method (300) as claimed in claim 9, wherein a high alert message is transmitted to the one or more users associated with the base stations and one or more public safety centers (220), wherein the high alert message indicates the data associated with the explosive device.

16. The method (300) as claimed in claim 9, wherein a low alert massage is transmitted to one or more users near the affecting cell area.

\* \* \* \* \*